INVENTOR.
JAMES L. BLAYNEY
BY
Brown, Denk & Synnestvedt
AGENTS

INVENTOR.
JAMES L. BLAYNEY
BY
Brown, Denk & Synnestvedt
AGENTS

Patented Nov. 11, 1952 2,617,964

UNITED STATES PATENT OFFICE 2,617,964

CURRENT-LIMITING CIRCUIT FOR CATHODE-RAY TUBES

James Leonard Blayney, Lansdale, Pa., assignor to Philco Corporation, Philadelphia, Pa., a corporation of Pennsylvania Application December 30, 1949, Serial No. 135,977

3 Claims. (Cl. 315—20)

The present invention relates to television receivers, and more particularly relates to means for preventing damage to the image-reproducing cathode-ray tube which may result from a flow of beam current in excess of that for which the tube is designed.

Television receivers commonly include a plurality of alternating-current amplifying stages. These would normally act to prevent low-frequency components in the composite television signal from being present at the control grid of the image-reproducing device, and hence changes in the average illumination of the scene being televised would not be faithfully reproduced at the receiver. This condition is overcome by the use of so-called "D.-C. reinserting" circuits, which develop a bias potential for the cathode-ray tube the value of which is determined by the average value of the video signal relative to a fixed reference voltage level. It is also customary to employ, in addition to this circuit, a manually-adjustable background control, which permits changes to be made in the average brilliance of the reproduced image to suit the taste of different observers.

In order to simplify the operation of the television receiver, it is desirable that this manual background control be eliminated. This is practicable in cases where the high-voltage supply for the cathode-ray tube is well regulated, and where the D.-C. restoration circuit is designed for efficient operation. Such an expedient, however, has heretofore subjected the cathode-ray tube to possible damage when the receiver contrast control is manipulated beyond the point where the beam current of the cathode-ray tube exceeds its maximum rated value. The very fact that the D.-C. restoring circuit operates efficiently over a wide range of video signal voltages acts to maintain the cathode-ray tube cut-off point at a substantial coincidence with the video signal blanking level over this entire range, and hence permits a strong video signal in the direction of white to cause an excessive scanning beam current to flow. Since the blanking level of the video signal under such conditions remains substantially at the cathode-ray tube cut-off potential, the high-contrast image is not objectionable to many observers, and hence the above-described conditions may continue for a considerable period of time. The life of the cathode-ray tube is thus appreciably lowered, and irreparable damage to its fluorescent screen may result.

It is accordingly desirable to provide means whereby a television receiver incorporating an automatic background control circuit may operate so that the maximum beam current which can flow in the cathode-ray tube either is limited to a safe value, or else so that a flow of current in the tube which exceeds this value will cause such a degradation of picture quality that an observer will of his own volition reduce the gain of the receiver.

In accordance with one feature of the invention, therefore, means are provided whereby a television receiver incorporating an automatic D.-C. restoration circuit may have its contrast control varied over the safe operating range of the the cathode-ray tube without affecting the normal D.-C. restoring action. However, if an observer manipulates the contrast control in a direction which would tend to exceed such a safe operating value, then means are provided whereby a large amount of degeneration is introduced into the cathode circuit of the image-reproducing tube. The blanking level of the composite television signal is accordingly no longer maintained at the cut-off voltage point of the cathode-ray tube, and the video portion of the signal is "pushed" into the black region. This effectively reduces the tube beam current, and tends to prevent the harmful effects mentioned above. Furthermore, since such a mode of operation results in a poorly reproduced image, the observer is enticed to manipulate the contrast control so as to reduce the receiver gain to a point within the proper tube operating range. Thus an upper limit is effectively established for the contrast control setting which coincides with the maximum permissible beam current in the cathode-ray tube.

One object of the present invention, therefore, is to provide a protective system for television receivers in which an effective limitation is placed upon the amount of cathode-ray tube current which is controllable by an observer.

Another object of the present invention is to provide a television receiving system in which the operating bias for the cathode-ray image reproducing tube is supplied from a limiter tube functioning as a cathode follower, and in which use is made of the change in impedance of this cathode follower unit when sufficient cathode-ray tube current is drawn so that the limiter tube is rendered non-conductive.

Other objects and advantages will be apparent from the following description of preferred forms of the invention and from the drawings, in which.

Figure 1:
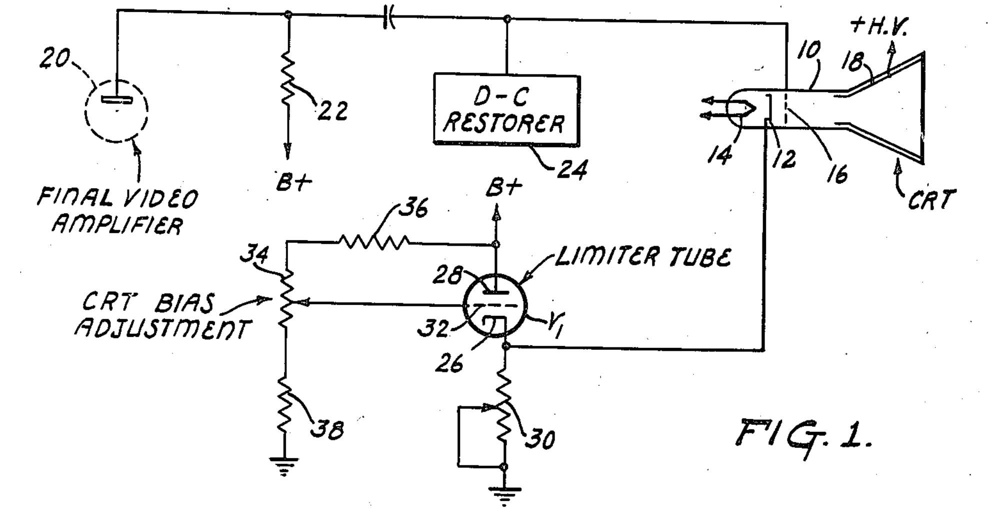
Fig. 1 is a schematic representation of a protective circuit in accordance with the present invention.

Referring first to Fig. 1, there is shown a portion of a television receiving system including a cathode-ray image-reproducing tube 10. Tube 10 is of conventional design, such, for example, as a 10BP4 or a TP400. It is provided with a cathode 12, a heater 14, a grid or control electrode 16, and an accelerating electrode or second anode 18. The remaining elements of tube 10, such as the first anode and the deflecting means, form no part of the present invention and hence have not been illustrated in order to simplify the drawing. It is assumed that the heating element 14 is supplied with suitable current and that the second anode 18 is connected to a suitable source of positive operating potential.

The television receiver of which tube 10 forms a part includes a series of electron discharge devices for amplifying the video portion of the received composite television signal. The final unit in this video amplifier chain comprises an output tube 20 which operates in a conventional manner to supply video signal information to the control grid 16 of the cathode-ray tube 10. The output of this video amplifier tube 20 (as developed across its load resistor 22) is of such nature that blanking pulses appear on the control grid 16 with negative polarity, while image signals representative of white extend in a positive direction.

In order automatically to control the average brilliancy, or background illumination, of the image reproduced by the tube 10 so that it may correspond to the average brilliancy of the image being transmitted, a D.-C. restoring circuit 24 is included between the video amplifier tube 20 and the cathode-ray tube 10. This D.-C. restoring circuit, or automatic background control device, 24 may be of any suitable type known in the art which is effective to maintain on the control grid 16 a bias potential the value of which is determined by the average value of the video signal output of tube 20 relative to a fixed reference voltage level. Inasmuch as the details of the D.-C. restoring circuit 24 form no part of the present invention, the unit has been indicated in the drawing by a labeled rectangle.

The cathode 12 of the image-reproducing tube 10 is connected directly to the cathode 26 of a limiter tube $V_1$. The latter may be a triode which is arranged as a cathode-follower unit, with its anode 28 being connected directly to a source of positive operating potential (such as +350 volts) and with its cathode connected to ground through a variable resistor 30. The control electrode 32 of tube $V_1$ is connected to the movable element of a potentiometer 34, which acts, in a manner to be later described, as a bias control for the cathode ray tube 10. The two terminals of the resistance element of potentiometer 34 are respectively connected to the source of positive operating potential for tube $V_1$ through an impedance 36, and to ground through a further impedance 38. Accordingly, the positive potential applied to the control electrode 32 of tube $V_1$ may be varied by an adjustment of potentiometer 34, while the flow of current through the tube may be varied by adjustment of the resistor 30.

Cathode-ray tube 10 is designed to operate with a beam current that does not exceed a certain predetermined value. This upper limit on the beam current of tube 10 is so chosen that the life of the tube shall be at a maximum, and so that its fluorescent screen shall not be damaged by the impact thereon of an electron stream of excessive intensity. Although the maximum current ratings for cathode-ray tubes vary considerably in practice, a figure of 140 microamperes is representative for a tube of the TP400 type. Means will now be described whereby this maximum beam current cannot be exceeded without an indication to the observer that the television receiver is not operating at its maximum efficiency.

The image-reproducing tube 10 has its cathode 12 connected directly to the cathode 26 of tube $V_1$. It is desired that tube 10 be normally biased to cut-off in the absence of a video signal of positive polarity applied to its grid 16 from the amplifier 20. If it be assumed that the positive bias necessary on cathode 12 in order to cut off tube 10 is 125 volts, then the cathode 26 of tube $V_1$ must also be at this same potential. The latter tube is preferably of a type having a fairly high transconductance, and is arranged to cut off sharply when its cathode becomes approximately 4 volts positive with respect to its grid.

Accordingly, under the conditions set forth, the potentiometer 34 is adjusted until the voltage on the grid 32 is approximately the same as the potential required on cathode 26 in order to cut off the cathode-ray tube 10, or approximately +125 volts in the example given. At the same time, the cathode resistor 30 is adjusted until the current flow through tube $V_1$ is equal approximately to the maximum allowable beam current of tube 10 (approximately 140 microamperes in the present example). Under the conditions now existing, tube 10 is cut off, tube $V_1$ is passing a current of approximately 140 microamperes, and its cathode 26 has a potential of approximately 125 volts positive. It is of course assumed that no video signal is being applied to the CRT control grid 16. The relationship of current flow accordingly will be as set forth in Fig. 2, with all of the current through the resistor 30 also flowing through the limiting tube $V_1$, and no part of it flowing in the cathode-ray tube 10.

It will be appreciated from an inspection of Fig. 1 that the impedance which is seen from the cathode 12 of tube 10 looking toward the limiter tube assembly is that of the cathode resistor 30 shunted by the relatively lower impedance of the limiter tube itself. While the adjusted value of the cathode resistor 30 may be in the order of one megohm, for example, the impedance of the triode $V_1$ is equal to the reciprocal of the tube $g_m$. In a tube having a high transconductance (at least 20 micromhos at 200 microamperes plate current) this is of low value relative to resistor 30. Furthermore, the current through tube $V_1$ depends almost entirely upon the potential of its control electrode 32, as determined by the setting of potentiometer 34, and also upon the adjustment of resistor 30, being virtually independent of tube characteristics.

Figure 2:
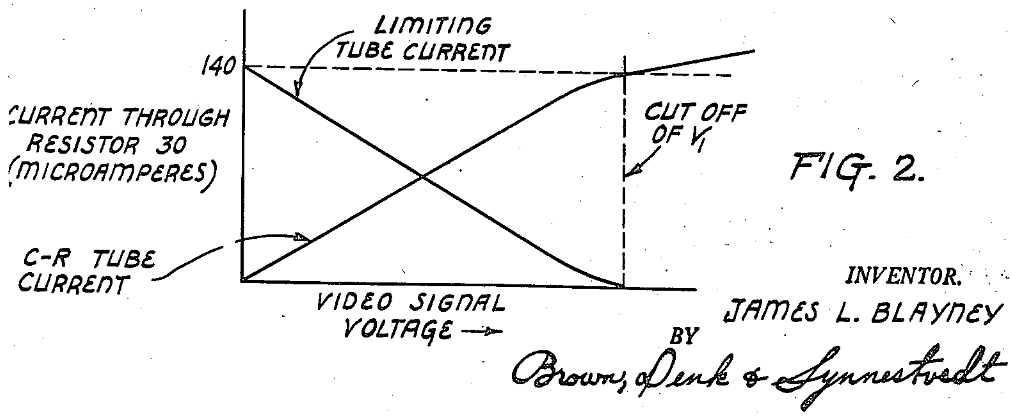

Thus a condition exists where all of the current which passes through the cathode resistor 30 flows through the tube $V_1$, and no beam current flows in the cathode-ray tube 10. Assume now that a video signal of positive polarity is applied to the control electrode 16 of the cathode-ray tube so that current flows in the tube and an image raster is traced on the fluorescent screen thereof. As will be seen from Fig. 1, this CRT beam current must flow through the resistor 30. However, the amount of current which flows through this resistor depends upon the potential drop thereacross, and this turn is determined by the potential of the cathode 26, since the other end of the resistor is grounded. This cathode potential, during conduction of tube $V_1$, can vary only slightly from the potential of the control electrode 32, and the latter is held constant at the adjusted potential of the potentiometer 34. Hence, the flow of cathode-ray tube current through resistor 30 cannot bring about a substantial change in the potential of cathode 26, and the total current through the cathode resistor 30 remains substantially constant. The result is that the flow of current through the limiting tube $V_1$ decreases in proportion to the increase in cathode-ray tube current, as shown in Fig. 2. It has been found in practice (using a circuit designed along the lines of Fig. 1) that with an initial cathode-ray tube bias of +125 volts, and with an initial current of 140 microamperes flowing through the resistor 30, an increase in video signal voltage on the control electrode 16 of the cathode-ray tube 10 results in a division of cathode-ray tube current and limiting tube current as set forth in the graph of Fig. 2. The point at which the limiting tube current reaches zero (or in other words the point at which the current flowing through cathode resistor 30 equals the beam current in the cathode-ray tube 10) represents the maximum permissible video signal voltage which may be applied to the cathode-ray tube 10 from the video amplifier 20 without exceeding the safe operating limit for which the cathode-ray tube is designed Under the conditions set forth, the bias voltage on the cathode-ray tube cathode 12 remains substantially constant (actually it increases by only 4 volts) while the cathode-ray tube beam current increases from zero to a value of approximately 140 microamperes. At this point, the current flowing through the resistor 30 equals the cathode-ray tube current, and the limiter tube $V_1$ is biased to cut-off.

Figure 3:
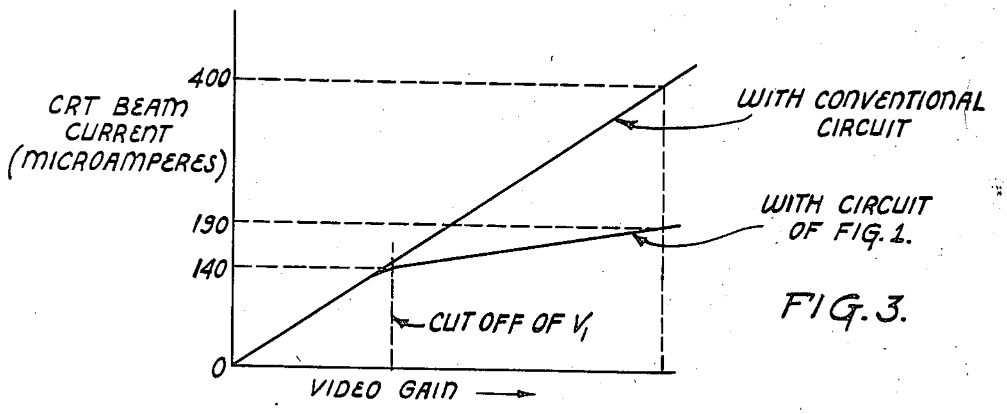
Figs. 2 and 3 are graphs illustrating the mode of operation of the circuit of Fig. 1.

It has been mentioned above that the impedance seen from the cathode 12 of tube 10 during the time that the limiter tube $V_1$ is conducting comprises the fairly high resistance 30 shunted by the relatively low resistance of the tube $V_1$. When the point is reached at which $V_1$ is cut off, however, the low shunting impedance of the latter tube is no longer present, and the impedance seen by the cathode 12 consists solely of the resistor 30. A further increase in current flow through this resistor as the receiver contrast contol is advanced will cause an increase in anode current flow in the cathode-ray tube 10, but this increase will be at a rate such as shown in Fig. 3. That is, from the point of cut-off of tube $V_1$ the curve of beam current bends sharply, so that at the maximum setting of the video gain control (representing an increase in the CRT bias from +129 to approximately +170 volts) the anode current of the CRT has reached a value of only 190 microamperes. This is comparable to a beam current of approximately 400 microamperes (a linear rise) which is usual in conventional television receivers.

Figures 4, 5, 6:
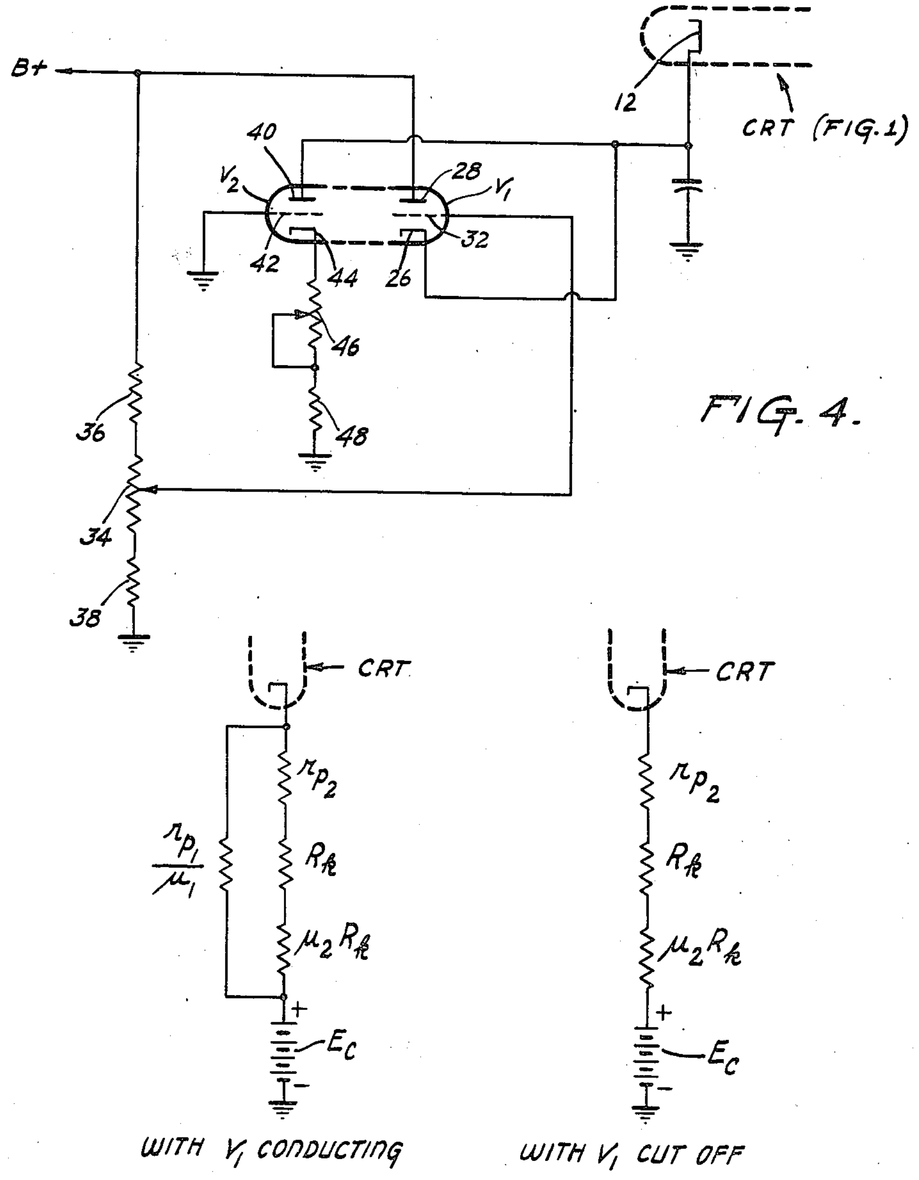
Fig. 4 is a modification of the circuit of Fig. 1.
Figs. 5 and 6 illustrate impedances equivalent to those present in the circuit of Fig. 4 under different operating conditions.

Fig. 4 shows a modification of the circuit of Fig. 1 in which the resistor 30 of the latter arrangement is replaced by an electron discharge tube. As shown in Fig. 4, the cathode 26 of tube $V_1$, instead of being connected to ground through the resistor 30 as in Fig. 1, is joined to the anode 40 of a further triode $V_2$. The control electrode 42 of this triode $V_2$ is grounded, while its cathode 44 is connected to one terminal of an adjustable resistor 46 the other terminal of which is grounded through a fixed resistor 48. The tubes $V_1$ and $V_2$ may, if desired, constitute the two sections of a 12AU7.

If the series-connected resistors 46 and 48 of Fig. 4 be designated as the cathode resistance $R_k$ of the triode $V_2$, then the equivalent circuit of Fig. 4 will be as shown in Figs. 5 and 6 under varying conditions of operation. For example, when the triode $V_1$ is conducting (or, in other words, when the beam current of the cathode-ray tube 10 is less than approximately 140 microamperes in the example given) then the impedance seen by the cathode 12 of the cathode-ray tube consists of a series of impedances $r_{p_2}$, $R_k$ and $\mu_2 R_k$, all of these series impedances being shunted by the impedance $$\frac{r_{p_1}}{\mu_1}$$

Since the latter is equal substantially to $$\frac{1}{g_m}$$

of tube $V_1$, it is of relatively low value, and the voltage on the cathode 26 remains substantially constant.

As soon as tube $V_1$ is biased to cut off, however, the shunting impedance $$\frac{r_{p_1}}{\mu_1}$$

is removed, and the equivalent circuit of Fig. 6 applies. The three impedances $r_{p_2}$, $R_k$, and $\mu_2 R_k$ are now present in series between the cathode 12 of tube 10 and ground. Any increase in current flow through these series-connected impedances results in a substantial increase in bias voltage on the cathode 12, with the result that the video signal is "pushed" into the CRT cut-off region.

The increased effectiveness of the circuit of Fig. 4 over that of the circuit of Fig. 1 is brought about primarily by a replacement of the static impedance of resistor 30 in Fig. 1 by the dynamic impedance of the triode $V_2$ in Fig. 4, the latter tending to exhibit a greater resistance to a change in the amount of current flowing therethrough.

The potentiometer 34 is provided for the purpose of permitting a selection of the initial bias voltage which is placed upon the cathode 12 of the image-reproducing tube 10. Once this bias voltage is properly selected, it need not normally be changed under ordinary operating conditions.

The following values are given as illustrative of those which have been found suitable for use in the circuits of Figs. 1 and 4. However, they are to be considered as merely exemplary, and are not to be construed in a limiting sense:

Resistor 30, 2 megohms
Resistors 34 and 36, 1 megohm
Resistor 38, 560 k.
Resistor 46, 100 k.
Resistor 48, 5600 ohms In Figs. 5 and 6 the values of the various impedances may be as follows:

$$r_{p_2} \cong 120 \text{ k.}$$

$$R_k \cong 100 \text{ k.}$$

$$\mu_2 \cdot R_k \cong 1.2 \text{ megohms}$$

$$\frac{r_{p_1}}{\mu_1} \cong 10 \text{ k.}$$

Having thus described my invention, I claim:

1. In combination, a cathode-ray tube having a cathode source of electrons, means for producing a beam of said electrons, and an element adapted to be supplied with a video signal to control the intensity of said beam; a vacuum tube having at least triode elements; a source of anode potential for said vacuum tube; a nonlinear impedance having one terminal conductively connected to the cathode of both of said tubes and having its other terminal conductively connected to a point of fixed potential, said nonlinear impedance having the characteristic of increasing in impedance with increasing current therethrough; and means for varying the bias of the grid of said vacuum tube relative to said point of fixed potential to vary the current in said nonlinear impedance and thereby to vary the potential of the cathode of said cathode-ray tube to control the average beam current thereof, whereby, when said vacuum tube is biased to conduct, it is operative to reduce the effective impedance between the cathode of said cathode-ray tube and said point of fixed potential.

2. In combination, a cathode-ray tube having a cathode source of electrons, means for producing a beam of said electrons, and an element adapted to be supplied with a video signal to control the intensity of said beam; a first vacuum tube having at least triode elements; a source of anode potential for said first vacuum tube; a nonlinear impedance having one terminal conductively connected to the cathodes of both of said tubes and having its other terminal conductively connected to a point of fixed potential, said nonlinear impedance comprising a second vacuum tube having at least triode elements, said second vacuum tube having its anode connected to the cathode of said first vacuum tube, its grid connected to a point of fixed potential and its cathode connected through an impedance to said first-mentioned point of fixed potential; and means for varying the bias of the grid of said first vacuum tube relative to said first-mentioned point of fixed potential to vary the current in said nonlinear impedance and thereby to vary the potential of the cathode of said cathode-ray tube to control the average beam current thereof, whereby, when said first vacuum tube is biased to conduct, it is operative to reduce the effective impedance between the cathode of said cathode-ray tube and said point of fixed potential.

3. In combination, a cathode-ray tube having a cathode source of electrons, means for producing a beam of said electrons, and an element adapted to be supplied with a video signal to control the intensity of said beam; a first vacuum tube having at least triode elements; a source of anode potential for said first vacuum tube; a nonlinear impedance having one terminal conductively connected to the cathodes of both said tubes and having its other terminal conductively connected to a point of fixed potential, said nonlinear impedance comprising a second vacuum tube having at least triode elements, said second vacuum tube having its anode connected to the cathode of said first vacuum tube, its grid connected to a point of fixed potential and its cathode connected through a resistor to said first-mentioned point of fixed potential, and means for biasing said grid of said first vacuum tube to a selected potential, the magnitude of said grid bias potential being selected to cause said cathode of said cathode-ray tube to be at the desired operating potential when said first vacuum tube is biased to conduct, the resistance of said resistor being selected to permit a current flow through said nonlinear impedance substantially equal to the maximum safe operating beam current of said cathode-ray tube when said first vacuum tube is biased to conduct, whereby the cathode of said cathode-ray tube is held at a substantially constant potential for values of beam current below said maximum safe operating value, and whereby the potential of said cathode of said cathode-ray tube increases rapidly in response to increases in beam current beyond said maximum safe operating value, thereby limiting the rate of rise of said beam current in response to increases in said video signal.

JAMES LEONARD BLAYNEY.

REFERENCES CITED

The following references are of record in the file of this patent:

UNITED STATES PATENTS

| Number | Name | Date |
|---|---|---|
| 2,092,373 | Holmes | Sept. 7, 1937 |
| 2,178,764 | Poch | Nov. 7, 1939 |
| 2,222,943 | George | Nov. 26, 1940 |
| 2,227,603 | Poch | Jan. 7, 1941 |
| 2,255,484 | Dome | Sept. 9, 1941 |
| 2,261,787 | Wendt | Nov. 4, 1941 |
| 2,280,670 | Spielman | Apr. 21, 1942 |
| 2,371,897 | Knick | Mar. 20, 1945 |
| 2,465,364 | Ferrar | Mar. 29, 1949 |
| 2,520,155 | Liekens | Aug. 29, 1950 |